Jan. 17, 1956  V. A. McCHESNEY  2,731,245
FINNED CONDUIT AND METHOD OF ATTACHING FINS TO CONDUIT
Filed Sept. 14, 1951  3 Sheets-Sheet 1
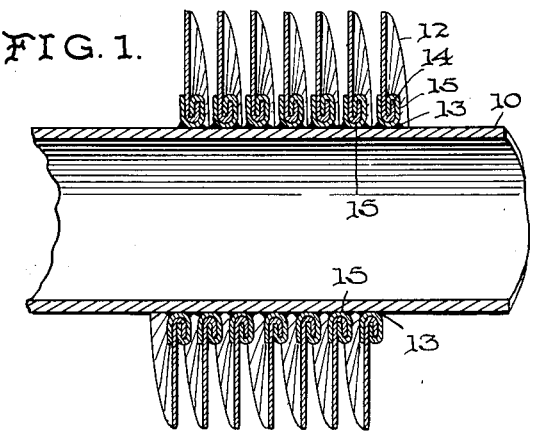
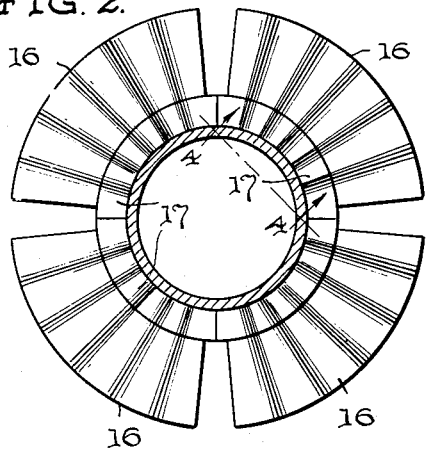
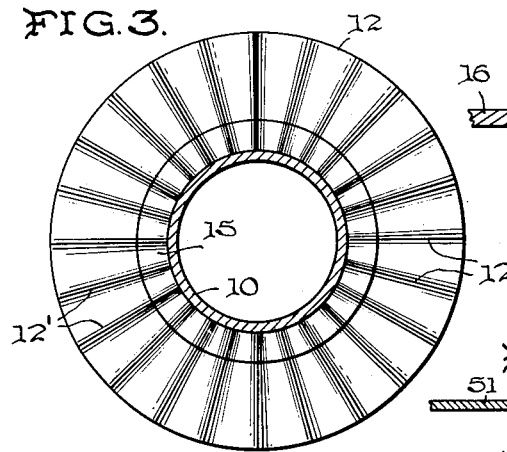
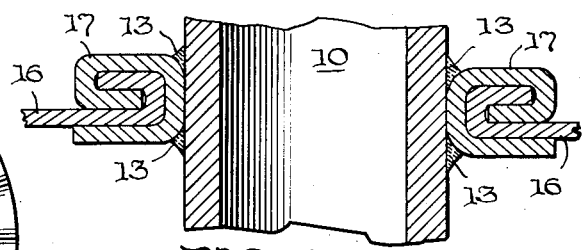
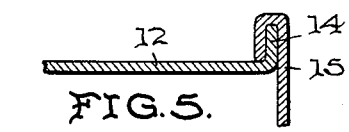
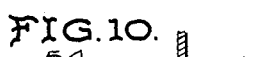
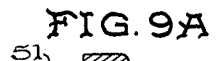
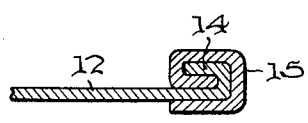
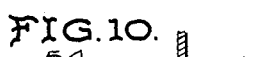
INVENTOR.
VERNON A. McCHESNEY
BY James E. Toomey
ATTORNEY Jan. 17, 1956 V. A. McCHESNEY 2,731,245
FINNED CONDUIT AND METHOD OF ATTACHING FINS TO CONDUIT
Filed Sept. 14, 1951 3 Sheets-Sheet 2
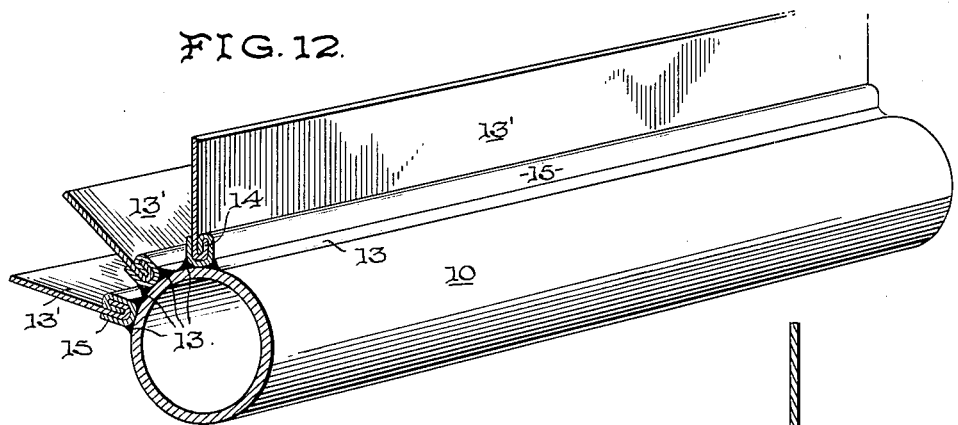
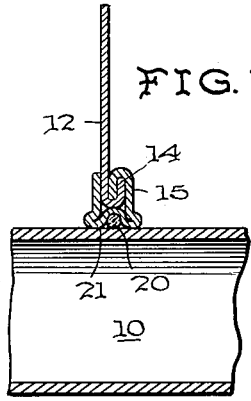
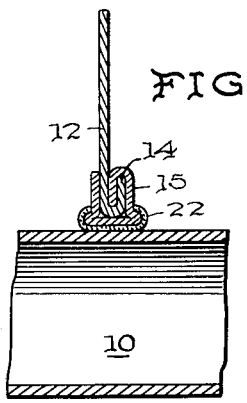
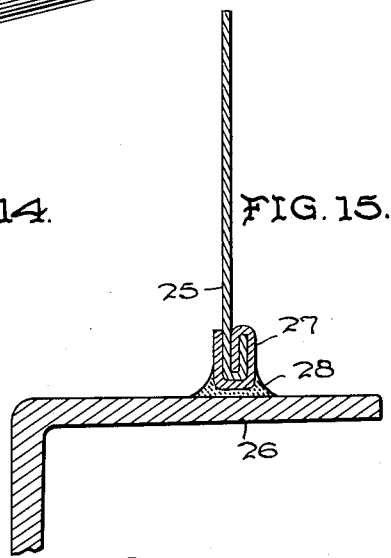
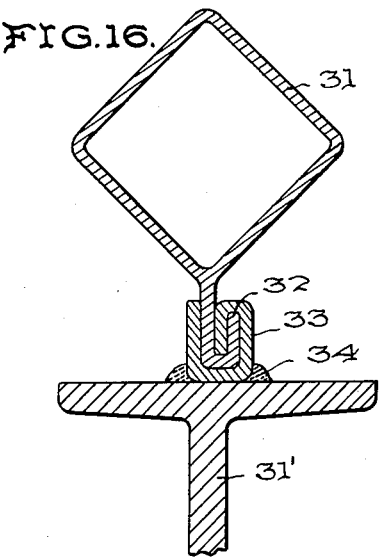
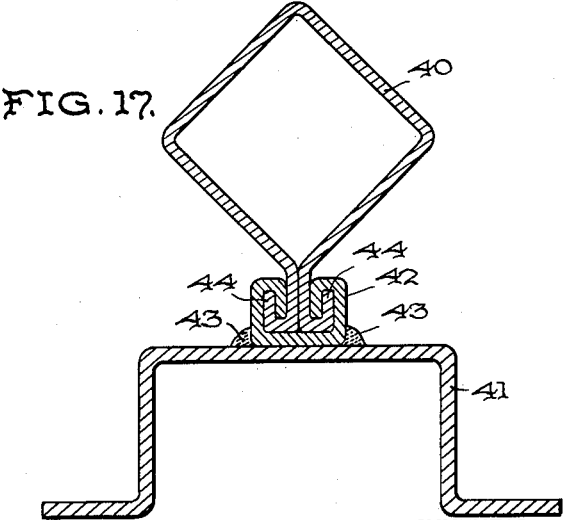
INVENTOR.
VERNON A. McCHESNEY
BY
James E. Toomey
ATTORNEY Jan. 17, 1956   V. A. McCHESNEY   2,731,245
FINNED CONDUIT AND METHOD OF ATTACHING FINS TO CONDUIT
Filed Sept. 14, 1951   3 Sheets-Sheet 3

INVENTOR.
VERNON A. McCHESNEY
BY
James E. Toomey
ATTORNEY

United States Patent Office 2,731,245
Patented Jan. 17, 1956

2,731,245

FINNED CONDUIT AND METHOD OF ATTACHING FINS TO CONDUIT

Vernon A. McChesney, Ypsilanti, Mich., assignor to Kaiser Aluminum and Chemical Corp., Oakland, Calif., a corporation of Delaware Application September 14, 1951, Serial No. 246,555

12 Claims. (Cl. 257—262.16)

This invention relates to a method of joining together a properly shaped element of one kind of metal to a second properly shaped element of a different kind of metal to form a particular product. More particularly, it is concerned with providing a novel method for joining together a properly shaped aluminum element to a second properly shaped element made from copper or another metal which is not capable of being readily soldered to aluminum to form such products as heat exchanger units, structural elements for buildings and the like.

In the past, whenever it was desirable to utilize an aluminum part as one element of a particular product because of its light weight and low cost, where the product had other parts made from copper, steel, galvanized iron, or nickel, etc., it was often not commercially feasible to do so because of the difficulties and expense involved in obtaining a firm attachment of the aluminum element to the other parts of the article when these other parts were made from a different metal not capable of being readily soldered to the aluminum element.

For example, in the manufacture of heat exchanger units, it has always been highly desirable to utilize heat-transferring fins made from aluminum instead of copper wherever possible because of the relatively low cost of aluminum as compared with copper. In addition, the efficiency of the aluminum fins when used as heat-transferring elements is very high and compares favorably with copper. In the past, however, there has been no widespread substitution of aluminum fins for copper fins since no simple, efficient and inexpensive method has been proposed for joining the aluminum fins to the main body of the heat exchanger when the main body or tubing was made from copper or a like material. The soldering method is not satisfactory because of the difficulties involved in attempting to solder aluminum directly to copper.

One of the methods which has been utilized to attach fins made from single flanged strips of aluminum to copper tubing is to pierce the flanged aluminum strips so as to form holes in the flanges thereof. The copper tubing is then threaded through the flange holes and after a series of strips have been placed about the tubing an expanding arbor is drawn through the tube to expand the tube so as to make a tight thermal contact between the copper tube and aluminum fins. No soldering or brazing is used in this method of making a heat exchanger assembly and it is practical. However, it is expensive and limited to certain designs of heat exchanger assemblies.

In connection with the making of heat exchanger units, wherein the fin is spirally or helically wound about a piece of copper tubing in the form of a ribbon, a copper ribbon instead of an aluminum ribbon is usually employed as the fin element because of the difficulties involved in joining the copper tube directly to the aluminum fin. This copper strip is spirally wrapped about the tubing and then secured thereto by brazing or the whole assembly can be sweat soldered together in a molten solder bath. This method for making a heat exchanger unit is also expensive.

It has been found, however, that an aluminum fin can be firmly and inexpensively secured to a copper tubing to form an efficient heat exchanger assembly, if that part of the aluminum fin which is to be attached directly to the copper tubing is first cold welded and/or lockseamed to an intermediate narrow strip of copper, this latter strip of copper then being soldered directly to the tubing. In other words, the intermediate copper strip serves as a securing strip or as the primary means for anchoring the aluminum fin to the copper tubing.

When a lockseam alone is used to attach the intermediate anchoring strip to the aluminum element, this intermediate strip need not be limited to copper. It could also be of other metals, such as galvanized iron, nickel or stainless steel, provided, of course, that it is made from relatively thin gauge material which will easily bend or flex. When the intermediate anchoring strip is cold welded to the aluminum element, it is preferably made from copper or some other readily solderable material which can also be cold welded with aluminum.

In addition, this method of joining or assembling an aluminum element with other elements made from a different metal is not limited to heat exchangers alone; it can also be advantageously employed in other fields, such as the building, ornamental metal, and decorative fields. It can be used, for example, to attach aluminum in any form, such as, sheet, tubing, extrusions, roll formed sections, etc., to other elements made from metals, such as, copper, steel, galvanized iron, nickel, etc.

Accordingly, it is an object of this invention to provide a novel, efficient and inexpensive method for joining aluminum elements to other elements of a different metal not capable of being readily soldered to aluminum to form various products.

A further object of the invention is to provide a novel method for satisfactorily joining an aluminum element to an element of a different metal not capable of being readily soldered to aluminum to form a structural member for a building, decorative parts therefor or other fixtures.

Another object of this invention is to provide a novel heat exchanger unit composed of both aluminum and copper elements, which are firmly joined together.

Another object of this invention is to provide a novel and simple method for satisfactorily joining an aluminum element to a copper element to form a compact heat exchanger unit.

A further object of this invention is to provide a novel and inexpensive method for securing aluminum fins to copper tubing and the like to form an efficient heat exchanger assembly.

Another object of this invention is to provide a novel heat exchanger assembly wherein the fins are made of aluminum and the tubing or conduit is made from copper or another metal not capable of being readily soldered to aluminum.

A further object of this invention is to provide a novel heat exchanger unit comprised of an aluminum fin and a tube of a different metal not capable of being readily soldered to the aluminum fin, the aluminum fin being secured to the tube by means of an intermediate anchoring strip composed of a material other than aluminum, part of this strip being lockseamed to the aluminum fin and the other part of the strip being attached by soldering to the non-aluminum tube.

A further object of the invention is to provide a novel heat exchanger unit comprised of an aluminum fin and a tube of a different metal not capable of being readily soldered to the aluminum fin, the aluminum fin being secured to the tube by means of an intermediate anchoring strip composed of a metal, such as copper, part of which copper strip is cold welded to the aluminum fin while another part of the strip is soldered directly to the tube.

Other objects and advantages of the invention will be more apparent from a review of the following detailed description when taken in conjunction with the drawings, wherein:

Figure 1 is an elevational sectional view of a novel finned tube heat exchanger of the instant invention comprised of a copper tube about which an aluminum ribbon has been spirally wrapped and to which the aluminum ribbon is anchored by means of an intermediate hemming strip;

Figure 2 is a cross-sectional view of a heat exchanger unit wherein the aluminum fins are in the form of arcuate segments affixed to the tubing or conduit;

Figure 3 is a cross-sectional view of the heat exchanger unit shown in Figure 1;

Figure 4 is an enlarged sectional view partially broken of the heat exchanger unit of Figure 2 when taken along the lines 4—4 in the said figure;

Figure 5 is an elongated cross-sectional view of one of the marginal edges of an aluminum fin showing the first step in lockseaming one edge thereof to a copper facing or hemming strip;

Figure 6 shows the final step in hemming the one marginal edge of an aluminum fin with a copper facing strip;

Figure 7 shows how the intermediate or anchoring strip can be cold welded to an aluminum member, such as, an aluminum fin, after which it is then lockseamed to the aluminum member as indicated in Figure 7A;

Figure 8 shows another arrangement for cold welding the aluminum member and the intermediate securing strip together, after which the securing strip may be bent into a U around the aluminum member as indicated in Figure 8A;

Figure 9 shows a further arrangement for cold welding the aluminum member and the intermediate securing strip, wherein the facing or securing strip is first bent into a U and then cold welded to the aluminum strip on both sides thereof as indicated in Figure 9A;

Figure 10 shows another arrangement for cold welding the aluminum member to the intermediate securing strip, to form the hemmed aluminum element of Figure 10A;

Figure 11 shows still another arrangement for cold welding the intermediate attaching strip to the aluminum element;

Figure 18:
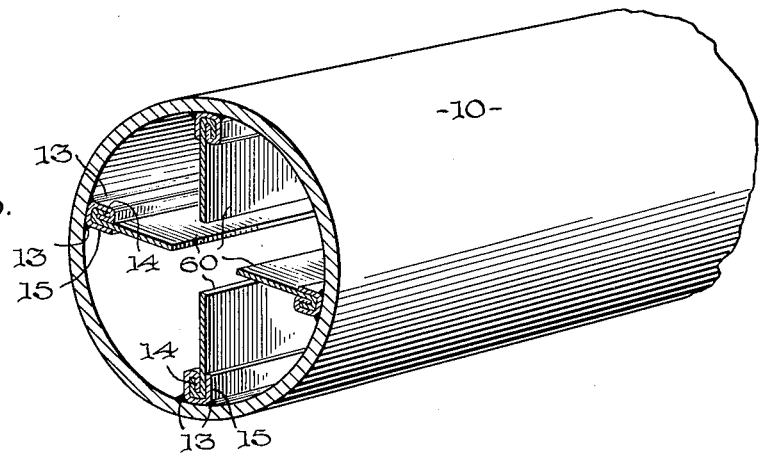
Figure 19:
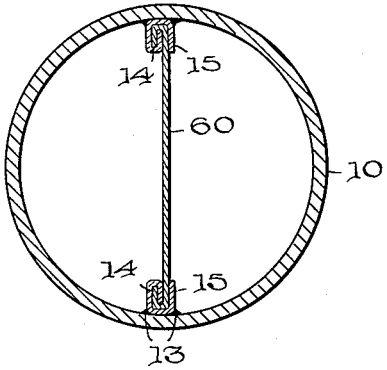

Figure 12 discloses a heat exchanger tube comprised of aluminum fins disposed longitudinally on a heat exchanger tube of copper, the aluminum fin being secured thereto by an intermediate hemming strip;

Figures 13 and 14 disclose modified arrangements for securing an aluminum fin to copper tubing while using an intermediate hemming strip;

Figures 15–17 disclose various arrangements for securing through the use of an intermediate hemming strip a bent, extruded or roll formed aluminum member to various types of structural or decorative elements which may be used in the architectural design of houses, stores or other buildings;

Figure 18 discloses an arrangement for securing aluminum fins to the interior surfaces of copper tubing while using intermediate hemming strips; and Figure 19 discloses an arrangement for securing an aluminum insert within a copper tube so as to divide the tube into sections.

With further reference to the drawings and particularly Figures 1, 3, 5 and 6, one of the products that can be made as a result of the instant invention is a heat exchanger unit comprised of a copper tube or body 10 having an aluminum fin 12 spirally wrapped therearound. This fin is in the form of a ribbon.

Prior to its being wrapped about the tubing 10, a portion of the ribbon is bent at an angle to the rest of the ribbon so as to form a flange 14 on one marginal edge thereof. As is best shown in Figure 5, this flange 14 is then encased or covered preferably on both sides by a copper jacket or facing strip 15.

After the flange 14 of fin 12 has been initially covered by facing strip 15, flange 14 and the copper facing strip or jacket 15 are both bent again in the manner indicated in Figure 6 so as to form a lockseam. The aluminum ribbon 12, together with its copper facing strip 15, is then spirally wrapped about the tubing 10 and the ribbon or fin secured thereto when the facing strip 15 is bonded to the tubing by means of the heated solder 13. Since the facing or hemming strip 15 and fin 12 are so completely and firmly locked or pressed together in close contact with one another, there can be an efficient and satisfactory transfer of heat from the tube 10 to strip 15 and then to fin 12.

All of the aforesaid bending operations can be performed by hand. However, the preferred embodiment of the invention contemplates that the copper hemming strip be placed on the aluminum fin in a roll forming machine provided with a series of rolls, the aluminum fin strip being fed into the machine at one point while the copper hemming strip is fed into the machine at another point, both pieces then being bent about one another in the manner indicated in Figures 5 and 6.

The hemming strip can also be attached to the aluminum ribbon in a power brake or sheet metal folding machine after which the hemmed strip is soldered to the tubing. This lockseaming of the aluminum and copper hemming strip provides for a firm and strong joint between the two which for all practical purposes is far superior to spot or resistance welded joints.

When fin or ribbon 12 and its associated facing strip are spirally wrapped about the tube or body 10, lateral corrugations 12' may be advantageously formed in the ribbon. In this way, not only is a greater amount of available fin area produced but in addition the hemming or facing strip 15 will be locked into firmer engagement with fin or ribbon 12.

In another advantageous embodiment of the invention as, for example, when the fins are not spirally wrapped about the copper tube or conduit 12, the aluminum fins may be applied to the tubing in the form of arcuate sections or segments 16 best shown in Figures 2 and 4. In this event, each segment 16 has affixed thereto a separate hemming or facing strip 17 which can be secured to the aluminum fin segments 16 in the manner previously described. The amount of lateral corrugations that may be made in the fin segments and facing strips 17 will depend, of course, upon the results desired.

After the segment 16 has been secured to the hemming or facing strip 17, this strip 17 is then soldered directly to the tubing and in securing facing strip 17 to the tubing the fin segment is likewise also affixed thereto. In addition to being directly soldered to tube 10 facing strips 17 may also be soldered to each other.

Although in Figure 2 the segments 16 are shown as being applied to a tubing 10 which is circular in cross-section, it is obvious that the same segments 16 may be easily affixed by the method previously discussed to a tubing which is elliptical, square, or rectangular in cross-section or to tubes of other cross-sectional designs. The same is likewise true when the fin is helically wrapped about the tubing.

In addition, as indicated in Figure 12, the same method of applying aluminum fins to copper tubing can also be employed to apply longitudinal fins 13' to the tubing 10. Although these fins 13' as shown in Figure 13 are flat, it is obvious they also may be corrugated or crimped in the same manner as the fins referred to above which are spirally wrapped about the tubing, or secured thereto in sections. The aforesaid method for applying aluminum fins to copper tubing may likewise be advantageously employed to attach ring or disc shaped fins to the tubing.

The tubing may also be made of steel or other like materials without departing from the spirit or scope of the instant invention and the tube may also be used to carry gases as well as fluids.

By using the aforesaid method, therefore, for making a heat exchanger unit, it is possible to inexpensively produce an efficient heat-transferring element, and one which can be easily repaired or replaced.

In addition to soldering the composite aluminum fin and copper hemming strip to the copper tubing by passing the complete assembly through a molten solder bath, it is also possible to accomplish this assembly by placing, as indicated in Figure 13, a strip of flux cored soldering material 20 within a suitable cavity 21 formed in the copper hemming strip. After the hemmed fin 12 has been placed upon the tubing and the soldering material 20 located within cavity 21, all that is necessary is to pass the complete assembly through an oven of sufficient temperature to cause the solder to flow and thereby bond the hemming strip and fin to the tubing, or instead of inserting the assembly in an oven a suitable hot gas may be passed through the tube with the same result.

As indicated in Figure 14, the soldering material might be in the form of a thin sheet of solder 22 roughly of channel configuration which is suitably bent around the lower part of the hemming strip 15.

Although the use of an intermediate hemming strip for attaching an aluminum element to a second element of different metal is particularly useful in the heat exchanger field for securing aluminum fins to copper tubing, it is obvious that the same method of joining an aluminum element to another element of a different metal might also be advantageously used in other fields.

For example, Figure 15 indicates how a sheet or plate 25 of aluminum can be affixed to a structural angle iron 26 through the medium of a copper or galvanized iron hemming strip 27, when the hemming strip is bonded by means of solder 28 to angle iron 26. Such a product would be extremely useful in the construction of window sills, floors, walls, etc. of buildings, trucks and trailers, etc.

Figure 16 discloses the manner in which an extruded aluminum member, such as a tube 31, can be affixed to the flange of a T or I beam 31', tube 31 being provided with a rib 32, to which a hemming strip 33 of suitable solderable material is affixed by means of a lockseam. By bonding hemming strip 33 to the T or I beam 31' through the medium of the solder 34, the tube 31 is also automatically secured to the beam.

Figure 17 discloses a similar arrangement for securing a roll formed aluminum tube 40 to a roll formed channel member 41 by means of the intermediate securing and hemming strip 42 and solder 43, each bent end 44 of the tube being lock seamed to the strip 42.

The extruded tube 31 of Figure 16 and the roll formed tube 40 of Figure 17 when mounted upon their respective structural members can then be advantageously used among other things as electric wiring conduits in the construction of buildings, trucks, trailers, vessels and the like.

Consideration has previously been given to the application of aluminum fins to the outside of tubing. There are, however, instances where it is highly desirable to locate aluminum fins or inserts inside the copper tubing 10. In this event, and as indicated in Figure 18, the inserts 60 may be longitudinally straight or they may be spirally wrapped within the tubing. They may also be of a short width, as indicated in Figure 18, or long enough, as indicated in Figure 19, so as to completely divide the tube into sections. Any of the arrangements indicated in Figures 13, 14 or 15 for attaching the fins or inserts 60 to the inside of the tubing could be satisfactorily employed for this purpose. When the tube 10 is divided into two parts, as indicated in Figure 19, it could then be advantageously used as an electrical wiring conduit.

Although the intermediate hemming strip can be affixed to the aluminum element through the medium of a lock seam alone as previously described prior to soldering the hemming strip to a tubing or other structural element, and satisfactory results can be obtained thereby, it also is within the contemplation of the invention that the hemming strip be also further secured to the aluminum strip by cold welding prior to their being lock seamed together, such as, for example, by the method disclosed in Sowter Patent No. 2,522,408 issued September 12, 1950. The intermediate securing strip can also be affixed to the aluminum element by cold welding alone, and without the additional step of lockseaming the two together.

Several ways of cold welding the hemming strips to an aluminum element, such as an aluminum fin, prior to soldering the hemming strip to a tubing or other structural element are indicated in Figures 7-11.

For example, as shown in Figure 7 a copper hemming strip 50 can be first cold pressure welded to an aluminum element 51, such as a fin for tubing, after which the two parts are then lockseamed together as shown in Figure 7A, or the two parts can be cold welded together as indicated in Figure 8 and formed into a U instead of being lockseamed.

Alternatively, the hemming strip 52 as shown in Figure 9 can first be formed into a U shape and then the whole assembly cold welded together on both sides to form the composite hemming strip and aluminum element or fin of Figure 9A. Also, as shown in Figure 10, the aluminum element or fin 54 could be formed into an L with the hemming strip 55 cold welded to the base of the L and then both elements formed into the double U of Figure 10A.

An aluminum element or fin 56 could also be formed into an L and the hemming strip 57 cold welded to the base of the aluminum element with no further forming required.

After the aluminum elements of the above examples have been cold pressure welded and/or lockseamed to the intermediate copper securing strips, these securing strips can then be soldered to tubes or various structural members to form heat exchanger assemblies, wire conduits for buildings, etc.

With regard to the aluminum fin element utilized in all embodiments of the above described method and resulting article, it is to be noted that words such as "aluminum strip," etc. as well as the word "sheet" are used in their broadest sense without regard to technical limitations and/or connotations generally accepted in the aluminum industry. Such a technical connotation might be, for example, that applied to the word "sheet," wherein the word, in the aluminum industry, specifically refers to material having a thickness greater than .005".

As used in the specification and claims, however, such a word as "sheet" would be applied in its generic and broadest interpretation to mean material having a large surface area as compared with the thickness as defined in Webster's Dictionary.

An advantageous embodiment of the invention has been herein illustrated and described. It will be understood, however, that various changes can be made in the invention without departing either from the spirit or scope thereof as defined by the appended claims wherein what is claimed is:

1. A method of joining a preformed aluminum sheet element to another preformed element of dissimilar metal incapable of being readily soldered to the aluminum element, comprising the steps of placing an entire face portion of an intermediate anchoring strip of metal readily solderable to said second mentioned metal in overlapped, intimate surface contact with a face of the preformed aluminum element and firmly joining the contacting faces of the preformed aluminum element and the intermediate strip of metal by highly compressing the contacting faces into inter-engaged, firmly anchored relationship without the application of appreciable external heat, and thereafter soldering a portion of the intermediate anchoring strip out of contact with the preformed aluminum element to said second preformed element of dissimilar metal to produce an inseparable union between the preformed elements of aluminum and the dissimilar metal.

2. A method of joining a preformed aluminum sheet element to another preformed element of dissimilar metal incapable of being readily soldered to the aluminum element, comprising the steps of placing an entire face portion of an intermediate anchoring strip of metal readily solderable to said second mentioned metal in overlapped, intimate surface contact with a face of the preformed aluminum element, and firmly joining the contacting faces of the preformed aluminum element and the intermediate strip of metal by compressing the contacting faces into bonded, firmly anchored relationship without the application of appreciable external heat and thereafter soldering a portion of the intermediate anchoring strip out of contact with the preformed aluminum element to said second preformed element of a dissimilar metal to produce an inseparable union between the preformed elements of aluminum and a dissimilar metal.

3. A method of joining a preformed aluminum sheet element to another preformed element of dissimilar metal incapable of being readily soldered to the aluminum element, comprising the steps of placing an entire face portion of an intermediate anchoring strip of metal readily solderable to said second mentioned metal in overlapped, intimate surface contact with the face of the preformed aluminum element and firmly joining the contacting faces of the preformed aluminum element and the intermediate strip of metal by bending and compressing the contacting faces into interlocked, firmly anchored relationship without the application of appreciable external heat and thereafter soldering a portion of the intermediate anchoring strip out of contact with the preformed aluminum element to said second preformed element of a dissimilar metal to produce an inseparable union between the preformed elements of aluminum and a dissimilar metal.

4. A heat exchanger comprised of a conduit and an imperforate sheet aluminum fin element having an edge attached to said conduit of a dissimilar metal incapable of being ordinarily soldered to said aluminum element, an intermediate, U-shaped, imperforate anchoring strip of the same material as the conduit interposed between the fin and the conduit elements of dissimilar metals, said U-shaped intermediate strip having the inner faces of its legs in intimate surface contact with and embracing the portions of the sheet aluminum fin element adjacent its edge, the contacting faces of the sheet aluminum fin element and the anchoring strip being compressively joined over a large area in fixed, inseparable relation, the outer portion of the base of the U-shaped anchoring strip being soldered to said conduit element of a dissimilar metal.

5. A heat exchanger as described in claim 4, wherein the conduit and the intermediate, U-shaped, imperforate anchoring strip are copper.

6. A heat exchanger as described in claim 4, wherein the area of contact between the sheet aluminum fin element and the faces of the leg portions of the U-shaped anchoring strip is compressively fused.

7. A heat exchanger as described in claim 4, wherein the compressively joined area of the sheet aluminum fin element and the U-shaped intermediate anchoring strip includes bent portions forming an interlocking joint between the sheet aluminum fin element and the U-shaped imperforate anchoring strip.

8. A heat exchanger as described in claim 4, wherein the sheet aluminum fin element and the intermediate, imperforate, U-shaped anchoring strip are spirally attached to the outer peripheral surface of the conduit of a dissimilar metal.

9. A heat exchanger as described in claim 4, wherein the sheet aluminum fin element and the U-shaped, imperforate anchoring strip are attached to the inner peripheral wall and longitudinally of the conduit.

10. A heat exchanger as described in claim 9, wherein the sheet aluminum fin element extends completely across the internal passage of the conduit and wherein the anchoring strip is soldered at diametrically opposite points to the inner surface of the conduit of a dissimilar metal.

11. A heat exchanger as described in claim 4, wherein the sheet aluminum fin element comprises strip elements of substantial length fastened by the imperforate U-shaped anchoring strip to the outer surface of the conduit.

12. A heat exchanger as described in claim 4, wherein the sheet aluminum fin element is disposed radially and longitudinally of the conduit and the U-shaped imperforate anchoring strip is soldered to the outer peripheral surface of the dissimilar metal conduit.

References Cited in the file of this patent

UNITED STATES PATENTS

| Number | Name | Date |
|---|---|---|
| 1,721,878 | Grimes | July 23, 1929 |
| 1,758,638 | Young | May 13, 1930 |
| 1,931,154 | Newman | Oct. 17, 1933 |
| 1,942,211 | Hartwig | Jan. 2, 1934 |
| 2,308,319 | Stanton | Jan. 12, 1943 |
| 2,327,259 | Gay | Aug. 17, 1943 |